United States Patent Office 3,050,358
Patented Aug. 21, 1962

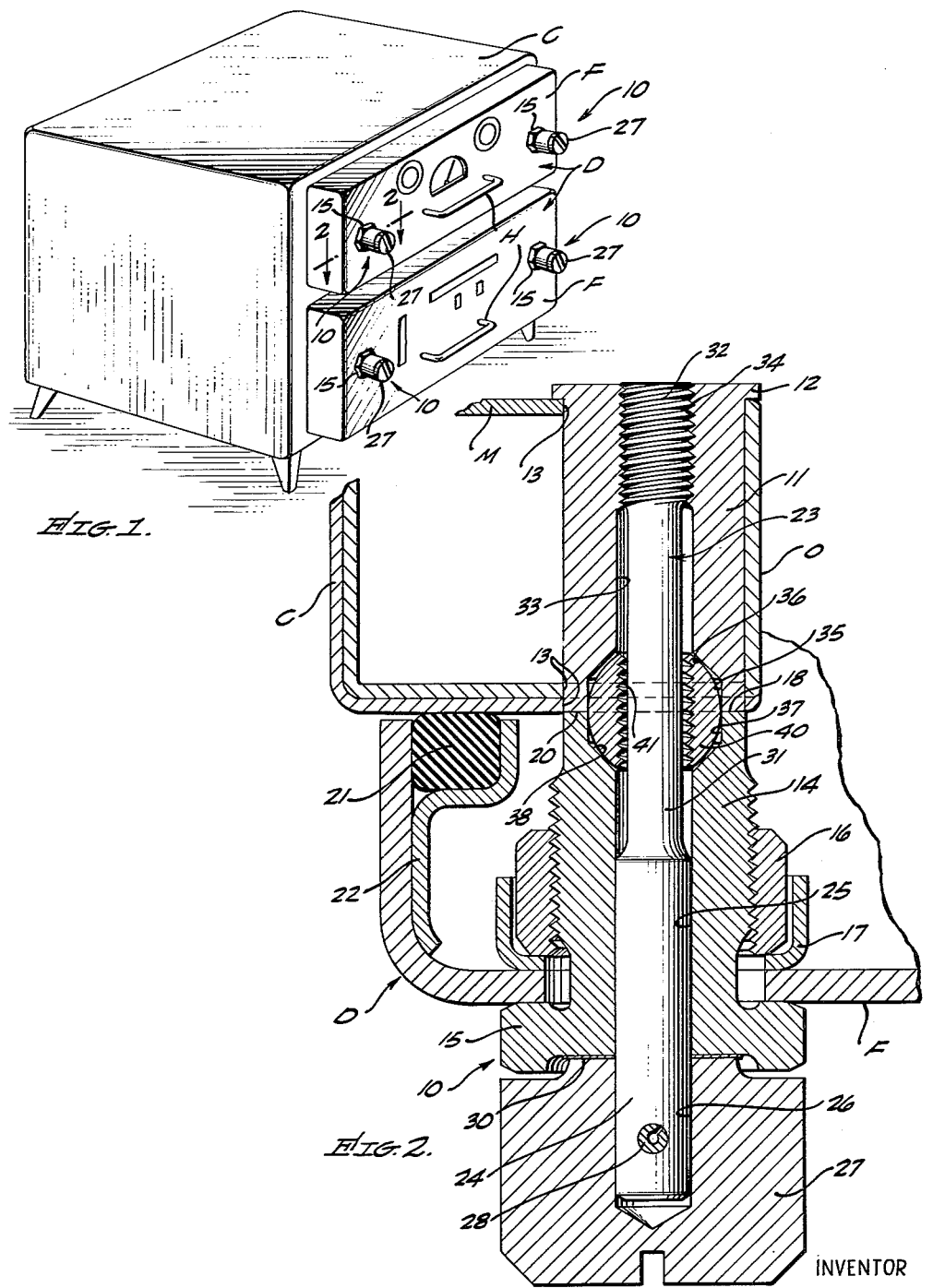

3,050,358
SHEAR FASTENER
Hans Jongbloed-Unterhorst, Newport Beach, Calif., assignor to Hughes Aircraft Company, Culver City, Calif., a corporation of Delaware
Filed Nov. 2, 1959, Ser. No. 851,214
2 Claims. (Cl. 312—333)

This invention relates generally to fasteners and relates more particularly to removable shear type fasteners that are adapted for disposition between normally relatively movable objects.

In many structures, it is desirable and often necessary that relatively movable portions thereof be firmly aligned and engaged in a manner to prevent relative movement in one position while freely enabling such movement in another position. Toward this end, it has been common practice to employ cylindrical type shear pins or dowels or to require the use of multiple fasteners such as screws, bolts or the like.

When employing devices such as dowels, dowel pins or tapered pins to support shear loadings, very close tolerances are required and any slight axial misalignment between the dowel pin and an apertured receptacle will cause binding, together with difficult assembly and disassembly.

In the packaging of electronic equipment, in order to permit adequate service of the equipment, it has become common to install such equipment in drawers or pull-out panels and chassis carried in suitable cabinets. When such drawers or the like are opened, the equipment carried therein is readily available for service. These drawers are generally disposed on tracks or rails and are frequently provided with latches to maintain closure. However, to insure freedom of movement of the drawer, it is necessary that tolerances surrounding the tracks and latches be relatively wide and, when the drawer is in a closed position, vibration of the drawer and its equipment may be present in certain use situations. Such vibration may be eliminated through use of positive fastening devices that are engaged after the drawer is closed and may take the form of the beforementioned bolts, screws and the like or dowel pins. Inasmuch as the drawers must be frequently opened to service the enclosed equipment, considerable time is expended in removing or releasing the bolts or screws and the pins tend to bind. Additionally, such fastening devices and certain types of pins do not adequately perform the necessary shear functions.

It is therefore one important object of the invention to provide a non-binding, close fitting shear type fastener for relatively movable objects.

Another object of the invention is to provide a shear fastener employing a spherical ball disposed in a parting plane of relatively movable objects.

A further object of the invention is to provide a shear fastener that is easily installed, connected and disassembled.

Still another object of the invention is to provide a shear fastener that is simple in construction, reliable and effective in use and inexpensive to manufacture.

Other and further important objects of the invention will become apparent from the disclosures in the following detailed specifications, appended claims and accompanying drawing, wherein:

FIGURE 1 is a perspective view showing the present shear fastener as employed with a drawer of an electronic equipment package; and FIG. 2 is an enlarged fragmentary sectional view through the present shear fastener as taken substantially as indicated by line 2—2, FIG. 1.

With reference to the drawing, and with reference primarily to FIG. 1, a cabinet C is illustrated and contains a pair of drawers D. The drawers D are carried on suitable guides, supports or rails (not shown), and are adapted to be withdrawn from the cabinet C to permit service of equipment carried thereby. Each of the drawers D has suitable handles H and front portions F which overlie a front area of the cabinet C. The drawers are adapted to extend into suitable drawer receiving openings O in the cabinet C.

As shown, each of the drawers D is provided with a pair of shear fastener assemblies indicated generally at 10. The fasteners 10 are positioned adjacent lateral sides of the drawers and have portions which extend outwardly from the forward faces F of the drawers D.

The shear fasteners 10 are identical and are typically shown in FIG. 2. As shown, the fasteners include a socket 11 that is generally tubular and which has an inner flange 12 that is adapted to engage an inner surface of corner frame member M of the cabinet C. The socket 11 is retained in any suitable manner in openings 13 in the frame member M and outer skin of the cabinet C. The present fastener further includes a housing 14 which has an integral hexagonal flange 15 that is adapted for engagement with the outer surface of the face portion F of the drawer D. The housing 14 is retained in position by means of a locknut 16 which threadably engages the outer surface thereof. A cup-shaped washer 17 is disposed between the locknut 16 and an inner surface of the face portion F of the drawer D.

The housing 14 has a planar inner end face 18 that is adapted for engagement and cooperation with a similar complementary planar outer end face 20 of the socket 11. The end face 20 of the socket 11 is positioned in lateral coextensive alignment with an outer surface of the skin of the cabinet C. The inner end face 18 of the housing 14 serves to define and limit the movement of the drawer D relative to the cabinet C. As shown, the drawer D may also be provided with a suitable resilient sealing member 21 that is retained thereon by means of a channel 22 that is suitably secured to the inner surface of the face portion F of the drawer D. It is thus to be noted that the complementary end faces 18 and 20 are disposed on a parting line between the drawer D and the cabinet C and are arranged normal to the axis of the socket 11 and housing 14.

As shown, a drawbolt 23 has an outer end portion 24 that is rotatably and slidably disposed in a bore 25 in the housing 14. The outer end of the drawbolt 23 is disposed in a bore 26 in a knob 27 and secured thereto by means of a laterally disposed pin 28. The knob 27 has an inner end disposed adjacent the flange 15 of the housing 14, there being a suitable washer 30 positioned therebetween.

The drawbolt 23 has an elongated reduced diameter central portion 31 and a threaded outer end portion 32. The reduced diameter portion 31 extends through and is spaced radially from a bore 33 in the socket 11 while the threaded portion 32 engages a threaded portion 34 of the bore 33 adjacent the inner flanged end of the socket 11.

The socket 11 has an enlarged counterbore 35 in the end thereof remote from the threaded portion 34 of the bore 33. The counterbore 35 is axially disposed relative to the axis of the bore 33 and has an inner beveled surface 36. The housing 14 is also counterbored as at 37 axially with respect to the bore 25 and has a beveled surface 38.

The counterbores 35 and 37, respectively, together with the beveled surfaces 36 and 38, respectively, form respective circular cavities which serve to define an enlarged annular or circular cavity, when complementary faces 18 and 20 are joined, that is adapted for reception of a spherical ball 40. The ball 40 has a diameter substantially equal to the diameter of the counterbores 35 and 37 and is bored and internally threaded as at 41 for cooperation with the threaded end portion 32 of the drawbolt 23.

It may thus be seen that the socket 11 and housing 14 are installed in position with the drawbolt 23 being disposed through the housing 14. The ball 40 is thereafter threaded over the threads 32 of the drawbolt 23 and slidably disposed on the reduced diameter portion 31 of the drawbolt. Thereafter, the planar ends 18 and 20 of the housing 14 and socket 11 are moved into contact with each other, and the ball 40 is disposed in the cavity formed between the counterbores 35 and 37 and their beveled surfaces 36 and 38. The center of the ball 40 thus lies on the parting plane between the drawer D and the cabinet C and provides a shear member between the drawer D and the cabinet C. Thereafter, the drawbolt 23 is moved inwardly whereby to engage the threads 32 thereof with the threads 34 of the socket 31 by rotation of the knob 27. The drawer D is thus secured to the cabinet C and retained against outward movement therefrom and is further supported in a shear manner relative to the cabinet C by disposition of the ball 40 on the parting plane between these normal relatively movable structures.

Upon withdrawal of the threads 32 from the threads 34, the drawer may be moved outwardly from the cabinet C, there being no binding of the shear member, in the form of the ball 40, relative to either the drawer or the cabinet, due primarily to the spherical configuration thereof. The ball 40 is normally retained on the reduced diameter portion 31 of the drawbolt 23 when the drawer is in an open position and can only be removed therefrom by deliberate engagement with and movement over the threads 32.

While the various details of construction herein serve the purposes intended, it is to be understood that other construction methods may be employed without departing from the spirit and scope of this invention. Specifically, while the ball 40 is normally retained in position on the reduced diameter portion 31 of the drawbolt 23 by means of the threads 32, other retention and assembly means may be employed.

Having thus described the invention of the present embodiment thereof, it is desired to emphasize the fact that still further modifications may be resorted to in a manner limited only by a just interpretation of the following claims.

I claim:
1. A shear fastener for use between a movable drawer and a cabinet comprising, in combination: a tubular socket carried by and secured to said cabinet; a tubular housing secured to said drawer, said socket and said housing being axially coextensive with each other; planar ends on said socket and said housing, said ends being adapted for engagement with each other and, when so engaged, lying in a plane of parting of said drawer and said cabinet; a counterbore formed in adjacent ends of both said socket and said housing, said counterbores having a common diameter greater than an inner diameter of said socket and said housing and defining a split cavity, an axial center of said cavity lying in said plane; a drawbolt disposed through said housing, having a threaded inner end portion and adapted for threadable engagement with said socket, said drawbolt having an outer end accessible from an outer surface of said drawer; and a shear ball freely slidably carried by said drawbolt and adapted for disposition in said cavity, said ball having a diameter substantially equal to a diameter of said cavity.

2. A shear fastener for use between a movable drawer and a cabinet comprising, in combination: a tubular socket carried by and secured to said cabinet; a tubular housing secured to said drawer, said socket and said housing being axially coextensive with each other; planar ends on said socket and said housing, said ends being adapted for engagement with each other and, when so engaged, lying in a plane of parting of said drawer and said cabinet; a counterbore formed in adjacent ends of both said socket and said housing, said counterbores having a common diameter greater than an inner diameter of said socket and said housing and defining a spilt cavity, an axial center of said cavity lying in said plane; a drawbolt disposed through said housing, having a threaded inner end portion and adapted for threadable engagement with said socket, said drawbolt having an outer end accessible from an outer surface of said drawer; and a shear ball freely slidably carried by said drawbolt and adapted for disposition in said cavity, said ball having a diameter substantially equal to a diameter of said cavity and internally threaded to match said threaded inner end portion of said drawbolt.

References Cited in the file of this patent
UNITED STATES PATENTS

| | | |
|---|---|---|
| 592,219 | Curtis | Oct. 19, 1897 |
| 870,018 | Cosgrove | Nov. 5, 1907 |
| 1,254,636 | Barghausen | Jan. 22, 1918 |
| 1,337,427 | Beach | Apr. 20, 1920 |
| 1,547,755 | Jackson | July 28, 1925 |

FOREIGN PATENTS

| | | |
|---|---|---|
| 104,579 | Great Britain | Mar. 15, 1917 |